United States Patent [19]
Purcell et al.

[11] Patent Number: 4,724,525
[45] Date of Patent: Feb. 9, 1988

[54] REAL-TIME DATA COLLECTION APPARATUS FOR USE IN MULTI-AXIS MEASURING MACHINE

[75] Inventors: Brian G. Purcell, Ansonia; John T. Tillson, Fairfield, both of Conn.

[73] Assignee: Moore Special Tool Co., Inc., Bridgeport, Conn.

[21] Appl. No.: 680,911

[22] Filed: Dec. 12, 1984

[51] Int. Cl.$^4$ .................. G01B 11/24; G01B 5/20
[52] U.S. Cl. .................. 364/560; 364/474; 364/550; 356/357
[58] Field of Search .................. 364/560–561, 364/563, 571, 551, 900, 200, 167, 142, 171, 178, 474; 318/600–603; 356/355, 357

[56] References Cited

U.S. PATENT DOCUMENTS

| | | | |
|---|---|---|---|
| 3,481,042 | 12/1969 | Lemelson | 33/174 |
| 3,551,649 | 12/1970 | Weber | 235/92 |
| 3,661,463 | 5/1972 | Brainard et al. | 317/106 |
| 4,056,850 | 11/1977 | Brown | 364/900 |
| 4,181,958 | 1/1980 | Juengel et al. | 364/560 |
| 4,475,154 | 10/1984 | Kunz | 364/167 |
| 4,573,139 | 2/1986 | Bonivich | 364/900 |
| 4,587,622 | 5/1986 | Herzog | 364/561 |

OTHER PUBLICATIONS

Schaffer, George; "Taking the Measure of CMMs", *American Machinist*, special report 749, Oct. 1982, pp. 145-160.

Ayres, John W. and James, Harold S., "Electrical Touch Probe for XYZ Coordinate Measuring Machine", *Proceedings of Southeastcon '80*, Nashville, Tenn. (®IEEE, Apr. 1980).

*Primary Examiner*—Errol A. Krass
*Assistant Examiner*—Thomas G. Black
*Attorney, Agent, or Firm*—Kramer, Brufsky & Cifelli

[57] ABSTRACT

A real-time data collection apparatus for use in collecting data from a multi-axis measuring machine comprises laser interferometers for outputting position measurement data from the measuring machine axis. A measuring probe produces an output signal as a function of probe deflection. The measurement data from the laser interferometers and the probe data are simultaneously captured in response to a data capture signal. The simultaneously captured data is input to a data analysis computer for subsequent processing.

16 Claims, 4 Drawing Figures

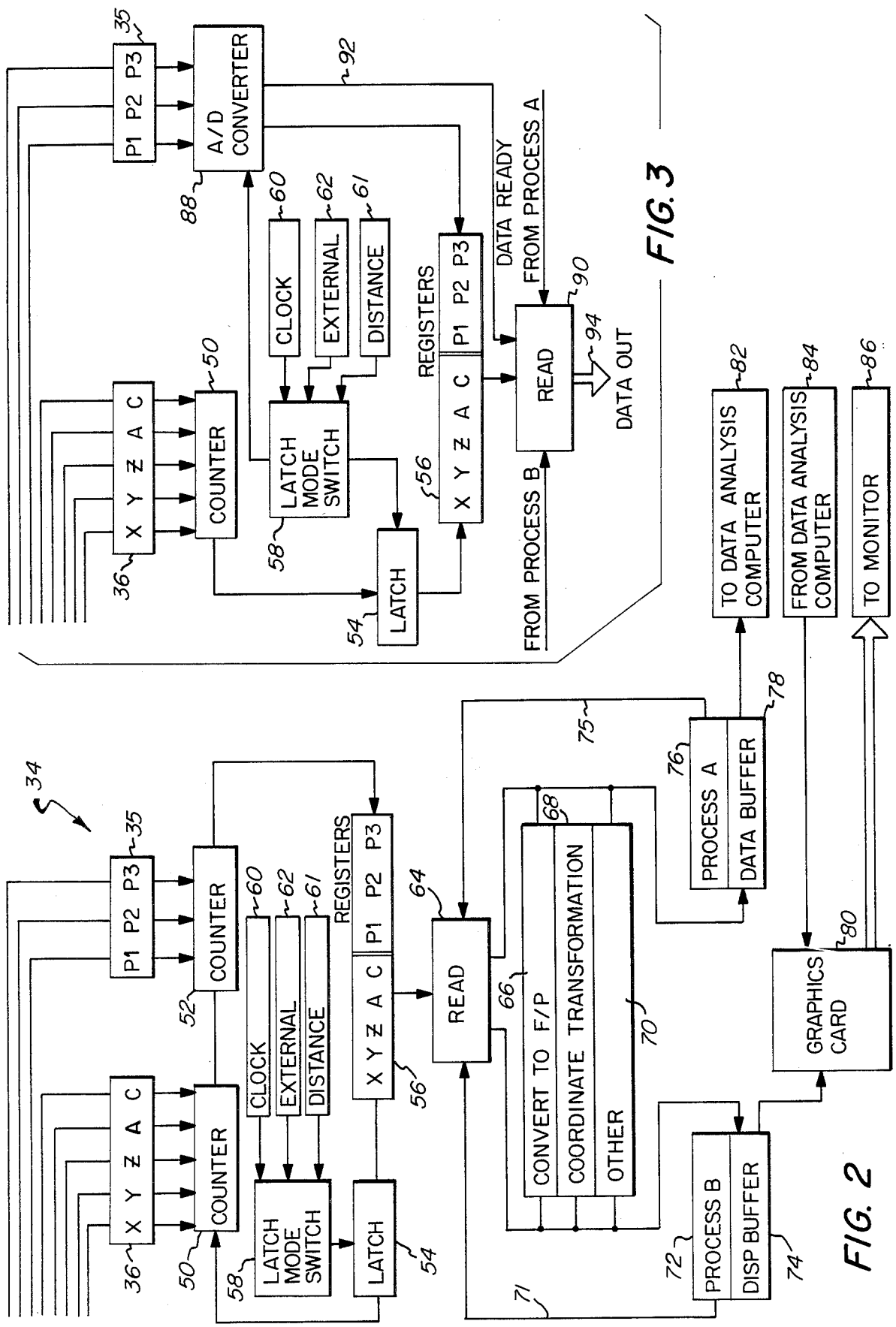

REAL-TIME DATA COLLECTION APPARATUS FOR USE IN MULTI-AXIS MEASURING MACHINE

BACKGROUND OF THE INVENTION

The present invention relates to precision measuring machines, and in particular to a real-time data collection apparatus for collecting data from an automated multi-axis measuring machine.

Precision measuring machines, such as the universal measuring machine manufactured by Moore Special Tool Co., Inc., the assignee of the present invention, are used to verify many types of physical dimensions on work pieces, including precision mechanical parts used in the aerospace industry and the like. Such machines are also used by standards bureaus and metrology laboratories to verify accuracies in increments as small as millionths of an inch.

In recent years, a rapid proliferation of computer-based coordinate measuring machines have been introduced into the marketplace. Such systems have been made possible by the advent of low-cost microprocessors. In most such systems, a microprocessor-based data-processing circuit is placed between the measuring elements of the machine and the digital display which outputs measurement data to the machine operator. The result has provided coordinate measuring machines with low-cost digital readouts and built-in data-collection and analysis functions. A good background of such coordinate measuring machines ("CMMs") is provided in an article entitled "Taking The Measure Of CMMs", George Schaffer, *American Machinist*, Special Report 749, October 1982, pages 145–160.

In some measuring applications, particularly those where extremely high accuracy is required, it is desirable to use an analog probe in the measuring machine to provide an accurate, limited-range, linear output signal proportional to its deflection. In using such an apparatus, the probe is moved with respect to the workpiece until contact is made. The machine coordinate and probe-head readings are added to provide the measuring result, with the probe data representing actual deviation from the measured coordinate data. However, in order to produce a precise result, it is imperative that the measured coordinate data and probe data be obtained simultaneously. Past coordinate measuring machines do not achieve the precise real-time simultaneous collection of data which is necessary to provide the high accuracies desired by some users of such machines. The present invention provides such accuracies by capturing or "latching" data from all of the measuring machine axes and a probe simultaneously.

Techniques have been used in the past to latch data from digital probes upon contact of the probe with a work surface. For example, such a technique is disclosed in a paper entitled "Electrical Touch Probe For XYZ Coordinate Measuring Machine", John W. Ayres and Harold S. James, *Proceedings Of Southeastcon '80*, Nashville, Tenn. (© IEEE, April 1980). The data from the digital probes disclosed is directly indicative of the machine coordinates. Thus, the problem of simultaneously reading data from an analog probe together with separate machine coordinate data is not present. Another technique for latching probe data is disclosed in U.S. Pat. No. 3,551,649 entitled "Position Measuring System". Again, there is no disclosure of the simultaneous reading of data from separate machine coordinate sensors and an analog probe. Instead, data are clocked, from each of a plurality of probes into a register for the probe data, independently for each probe. Similarly, U.S. Pat. No. 3,481,042 entitled "Surface Sensing Apparatus" discloses apparatus wherein probe data is gated only upon contact of the probe with the workpiece.

In U.S. Pat. No. 4,181,958 a scheme is disclosed for a "Multiple Probe Gauge System" wherein the analog output signal of a plurality of probes is successively sampled, digitized and stored. The stored information is then digitally processed by a microprocessor to produce a digital signal which is a function of the analog output signals of selected probes. Like the other references discussed hereinabove, this patent also fails to disclose a system wherein coordinate measurement data and probe data are simultaneously captured or latched to provide for highly accurate measurements.

Accurate measuring systems have been constructed in the past using laser interferometer techniques to provide measurements along multiple axes. An example of such an apparatus is shown in U.S. Pat. No. 3,661,463 entitled "Single Interferometer Multiple Axis Laser Measuring System". In the measuring machine shown in that patent, however, there is no probe for measurement of minute deviations from the coordinate measurements provided by the laser system.

It would be advantageous to provide an automated multi-axis measuring machine having accuracies on the order of millionths of an inch. Such a machine should utilize an analog probe in combination with sensors (e.g. laser interferometers) providing measurement data along each of the machine's axes, to provide deviation readings along the axes. In order to ensure the accuracy of measurements, data from the probe and data from the sensors should be captured concurrently for reading by appropriate data processing components. Such an apparatus would, in effect, take periodic "snapshots" of data from the probe and sensors to provide real-time data collection of desired measurements.

The present invention relates to such a measuring apparatus.

SUMMARY OF THE INVENTION

In accordance with the present invention, a real-time data collection apparatus is provided for use in collecting data from a multi-axis measuring machine. The apparatus includes sensor means for outputting position measurement data from at least one axis of a measuring machine. The sensor means can, for example, comprise a laser interferometer. A different laser interferometer can be used for each different axis of a measuring machine. A measuring probe is provided having means for producing an output signal as a function of probe deflection. The measuring probe can be of a type which produces output signals indicative of the magnitude of probe deflection in a plurality of different dimensions. Means are provided for simultaneously capturing data from the sensor means and the probe in response to a data capture signal. Further, means are provided for forwarding the simultaneously captured data from the sensor and probe means to a data analysis computer.

The data capturing means can comprise clock means for producing periodic data capture pulses to effect periodic data capturing operations. Means can also be provided for disabling the clock means, together with manually actuable switch means for producing a data capture signal. In this manner, a measuring machine operator can externally effect data capturing operations when the clock means are disabled. Alternately, all data capturing operations can be made externally by a machine operator, in which case there would be no need for a clock to produce data capture pulses.

Data capture can alternately be triggered in response to incremental distance traveled along any of the measuring machine axes or any combination of axes. Means can be provided to enable a machine operator to select such distance parameters as desired for a particular application. For example, the operator may desire to capture data every time the X axis of the measuring machine is incremented by one-tenth of an inch since the last data capture. In this "distance mode" of operation, the clock means is disabled.

The measuring probe can be of a type which produces an analog output signal. In such case, the apparatus of the present invention would further comprise an analog to digital converter, and means responsive to a data capture signal for triggering the converter to convert an analog signal from the probe to a digital signal. Means can further be provided for generating a data ready signal after completion of an analog to digital conversion.

Register means can be provided for storing data captured from the sensor means and the probe. In conjunction with the register means, means are provided for transferring stored data to a data analysis computer in response to a data ready signal.

Means can further be provided for processing data from the register means, in accordance with a predetermined algorithm, as the data is transferred to the data analysis computer. For example, the data from the sensor means and probe can be converted to floating point data for transfer to the data analysis computer. In addition to the above, means can be provided for displaying processed data from the register means, in intelligible form, on a display associated with a multi-axis measuring machine from which the data are taken.

BRIEF DESCRIPTION OF THE DRAWINGS

FIG. 2 is a block diagram of one embodiment of a data collection computer for use in the present invention;

FIG. 3 is a block diagram of an alternate embodiment of the data capturing components of the real-time data collection computer.

DETAILED DESCRIPTION OF THE INVENTION

Figure 1:
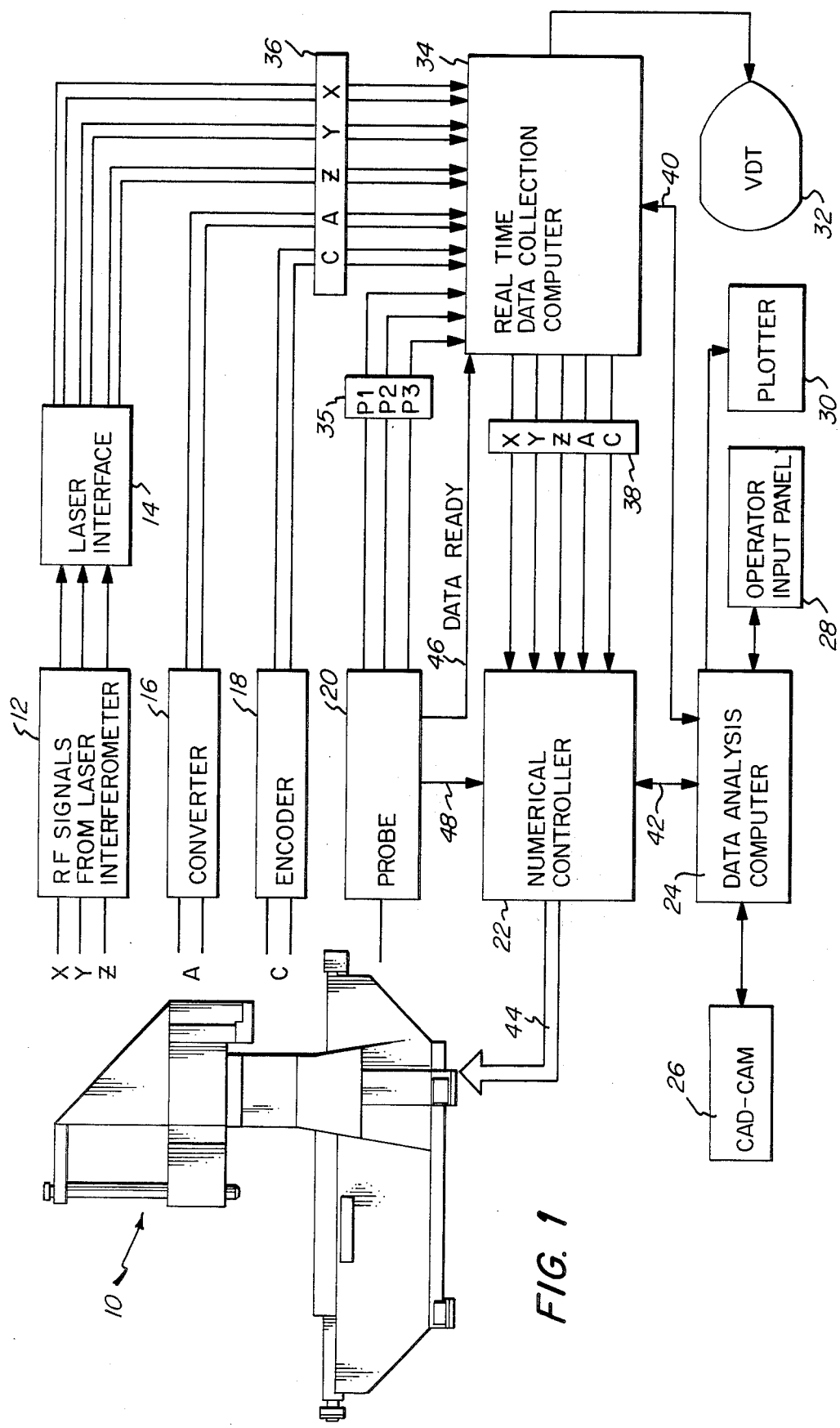
FIG. 1 is a block diagram showing a multi-axis measuring machine and the components coupled thereto to provide real-time data collection in accordance with the present invention.

The present invention provides apparatus for the real-time collection of data from a multi-axis measuring machine 10, shown in FIG. 1. In the embodiment illustrated, the measuring machine has five axes, namely X, Y, Z, A, and C. The X, Y, and Z coordinates are measured using laser interferometer techniques well-known in the art. The laser interferometers produce radio frequency ("RF") signals which are input at box 12, and transmitted therefrom to a laser interface 14. Various functions are provided by laser interface 14, including compensation of the RF signals, and means for converting the data received from the laser interferometers between English and metric values. An example of the type of laser interferometer which can be used is that sold by Hewlett Packard Corporation and designated model HP-5501. Laser interface 14 can comprise a coupler manufactured by Hewlett Packard Corporation and designated the HP-10740A.

Data from a rotary table (A axis) of measuring machine 10 is input to a converter 16 which changes the A axis data into A quad B format. Data indicative of part normalcy (C axis) is input from measuring machine 10 to an encoder 18 which converts the C axis data into A quad B data. The A quad B data from laser interface 14 (X, Y, and Z axes), converter 16 (A axis), and encoder 18 (C axis) is input to real-time data collection computer 34. Box 36 in FIG. 1 indicates that the data input to real-time data collection computer 34 comprises the measured coordinates from each of the X, Y, Z, A, and C axes.

The measuring machine which incorporates the present invention utilizes a probe 20 to indicate when contact is made with a workpiece being measured. Probe 20 is preferably an analog probe which provides an accurate, limited-range, linear output signal proportional to its deflection. Electronics associated with probe 20 output a binary coded decimal (BCD) signal to real-time data collection computer 34. The BCD data amounts to a probe output signal, the value of which is a function of probe deflection. Probe 20 shown in FIG. 1 is a three-dimensional probe, and box 35 indicates that data from each of the three dimensions is input to data collection computer 34. An optional data ready signal may be output from probe 20 on line 46 for a purpose to be described hereinbelow. The data ready signal, if provided, is input to data collection computer 34 as shown in FIG. 1.

The mechanical movement of measuring machine 10 is controlled by a numerical controller 22, coupled to machine 10 via data bus 44, in a conventional manner. A probe crash signal can be provided to numerical controller 22 via line 48, to shut down measuring machine motion if the maximum deflection of probe 20 has been reached. X, Y, Z, A, and C data are input to numerical controller 22 from real-time data collection computer 34, as indicated by box 38. Such data forms a control loop which is used by numerical controller 22 to ensure proper movement of the measuring machine's components.

A video display terminal 32 coupled to data collection computer 34 displays data processed by the data collection computer, in intelligible form, to an operator of measuring machine 10. Such display data are indicative of measurements taken by measuring machine 10.

Data collection computer 34 is also coupled to a data analysis computer 24, which provides mass storage for measurement data and sophisticated data processing functions for analysis of data from measuring machine 10. Data analysis computer 24 can support, for example, CAD-CAM features, as indicated at box 26. An operator input panel 28 enables a measuring machine operator to interface with the measuring machine through data analysis computer 24 which, in turn, is coupled to numerical controller 22 via bi-directional data bus 42. A plotter 30 can be coupled to data analysis computer 24 to plot results of data processing performed by computer 24.

Turning now to FIG. 2, the real-time data collection computer 34 is shown in block diagram form. As in FIG. 1, X, Y, Z, A, and C data are input to real-time data collection computer 34 as indicated by box 36. Similarly, probe data is input to data collection computer 34 as indicated at box 35. The digital data from the X, Y, Z, A, and C axes are input to a counter 50. The digital data from probe 20 are input to a counter 52. Latch 54 is provided to simultaneously capture data from the X, Y, Z, A, and C axes together with data from the probe in response to a data capture, or latch signal. The captured data is held in registers 56 for subsequent processing. A data capture or latch operation is effected either by an internal clock which produces periodic data capture pulses, by a distance trigger signal which produces a data capture pulse when a machine axis or combination of axes has travelled a predefined distance increment, or by an external manually actuable switch. A measuring machine operator can effect data capture by actuating the manual switch.

The three modes of data capture are illustrated in FIG. 2 by a clock 60, a distance trigger switch 61, and an external switch 62 which are coupled to a latch mode switch 58. When the internal data capturing mode is in use, pulses from clock 60 will be connected to latch 54 via latch mode switch 58. When in the distance mode of data capture operation, a data capture signal produced by distance trigger switch 61 is coupled to latch 54 via latch mode switch 58. When in the external mode, a data capture signal produced by the manually actuable switch 62 is coupled to latch 54 via latch mode switch 58. The latching of data by real-time data collection computer 34 results, in effect, in a "snapshot" being taken of data from measuring machine 10 upon occurrence of a data capture signal. By simultaneously capturing data from the machine axis sensors and the machine probe, extreme accuracy is assured. At any given moment when data is captured, the machine operator can be confident that readings are taken from the X, Y, Z, C, and A axis at precisely the same moment that data are taken from the probe. This procedure affords an accuracy in measuring heretofore unobtainable in an automated measuring machine.

Once data are latched into registers 56, the data can be read by suitable circuitry 64 well-known in the art. Data collection computer 34 can run a plurality of processes, designated "Process A" and "Process B" in FIG. 2. A read signal can be generated by the processor 76 of Process A and input to read circuitry 64 via line 75 to effect a read operation. Similarly, processor 72 of Process B can provide a read signal via line 71 to cause read circuitry 64 to read data from registers 56. As shown in FIG. 2, Process A provides data to data analysis computer 24 as indicated at box 82. A data buffer 78 is used to temporarily store data from measuring machine 10 as it is transferred to data analysis computer 24. Process B can be used to display, in intelligible form and on a display associated with measuring machine 10, measurement data read from registers 56. A display buffer 74 associated with Process B temporarily stores data to be displayed as it is transferred to a graphics card 80 and video display terminal or comparable monitor as indicated as box 86.

Data read from registers 56 by circuitry 64 can be processed, in accordance with a predetermined algorithm, as the data are transferred to data analysis computer 24. Similarly, data from registers 56 can be processed according to a predetermined algorithm prior to display thereof on a monitor.

The predetermined algorithm for processing data read from registers 56 can, for example, convert the data to floating point format, designated at box 66. The data can also be processed to provide coordinate transformation as indicated at box 68. Other functions, indicated at box 70, can also be provided by appropriate predetermined algorithms well-known in the art.

In an alternate embodiment set forth in FIG. 3, real-time data collection computer 34 can simultaneously capture data from the X, Y, Z, A, and C sensors (e.g., laser interferometers) and a multi-dimensional analog probe. As in FIG. 2, the X, Y, Z, A, and C data are input to data collection computer 34 as indicated by box 36. Similarly, probe data are input to data collection computer 34 as indicated at box 35. The mechanism for latching the X, Y, Z, A, and C data is the same in FIG. 3 as in FIG. 2. In capturing data from an analog probe, however, an analog to digital converter 88 must be provided. Since the analog to digital conversion does not occur instantaneously, a period of time must be provided for completion of the conversion prior to reading data from registers 56. Thus, analog to digital converter 88 (which may be built into an analog probe used with measuring machine 10) provides a data ready signal on line 92 for enabling read circuitry 90 to read data from registers 56 only *after* the analog to digital conversion has been completed and the converted data has been stored in registers 56. When an internal (clock) or external (manually actuated switch) pulse is provided to latch mode switch 58, analog to digital converter 88 immediately samples the data from the probe and commences analog to digital conversion. At the same instant, the X, Y, Z, A, and C data is captured and latched into registers 56. After the captured probe data is converted and stored in registers 56, a data ready signal is generated by converter 88 which enables circuitry 90 to read the data from registers 56. The data which is read is output on lines 94 and processed in the same manner discussed above with respect to FIG. 2.

Figure 4:
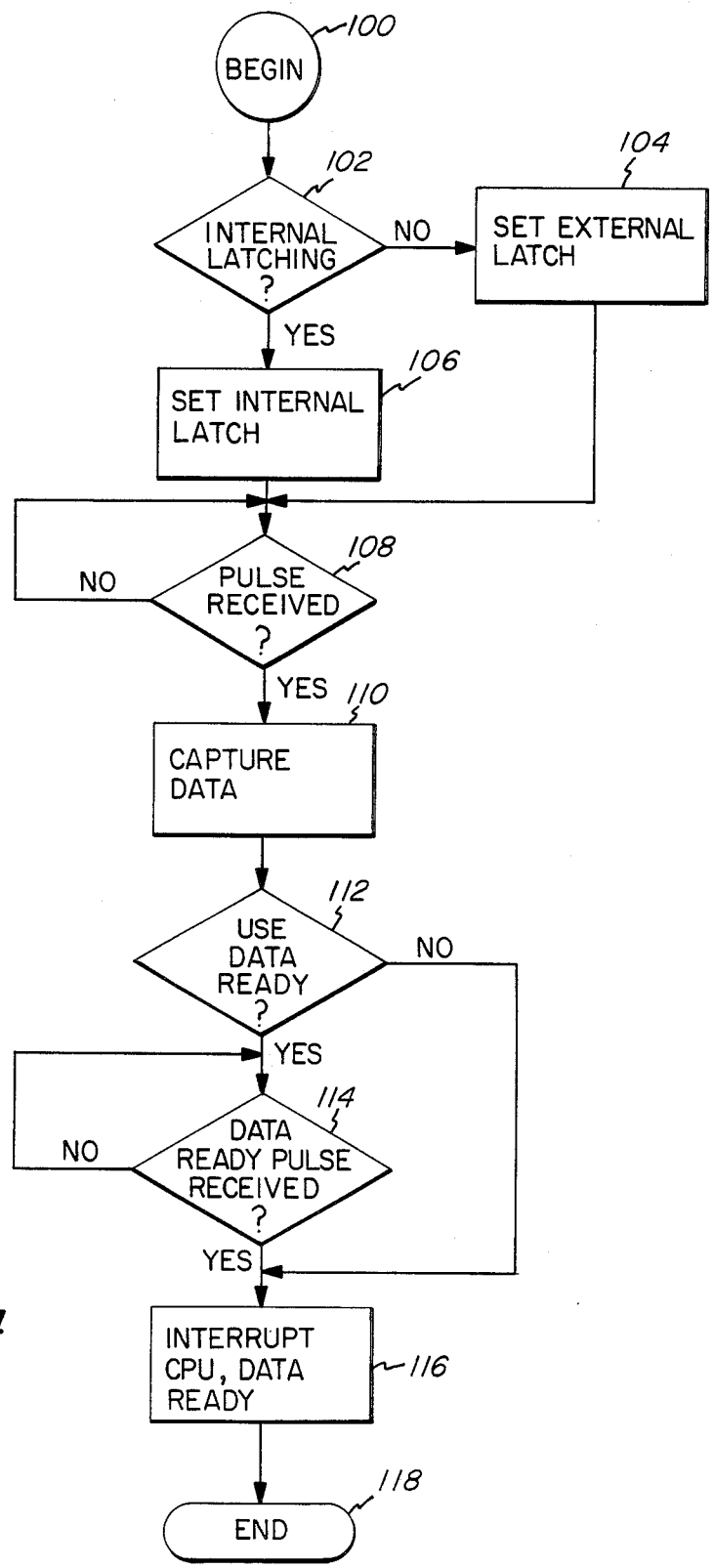
FIG. 4 is a flowchart illustrating a data latch selection routine used in the embodiment of the data collection computer shown in FIG. 3.

FIG. 4 is a flow chart for a routine used by data collection computer 34 in selecting whether an internal (i.e., clock pulse or distance trigger pulse) or external latch operation is to be used. The routine also accommodates analog probes by providing a mechanism for enabling data to be read only after a data ready pulse has been received. The routine is entered at box 100, and at box 102 a determination is made as to whether internal latching is to be used. If not, then external latching (i.e., manually actuable switch) is enabled at box 104. At this point, the internal clock will be disabled from effecting latch operations.

If it is determined at box 102 that internal latching is desired, control passes to box 106 where latching by the internal clock is enabled for clock pulse operation, or where the distance triggering routine is enabled for the distance mode of data capture operation. Control then passes to box 108, where a determination is made as to whether a data capture pulse (either an internal latch pulse or external latch pulse) has occurred. If not, control is continuously looped through box 108 until a pulse is received. Upon such occurrence, control passes to box 110 and data is simultaneously captured from both the X, Y, Z, A, and C axis sensors and the probe.

At box 112, a determination is made as to whether a probe which generates a data ready signal is in use. If so, control passes to box 114 and a determination is made as to whether a data ready pulse has been received. Control loops through box 114 until such pulse is received.

Once a data ready pulse is received, control passes from box 114 to box 116 where the central processing unit of the data collection computer is interrupted, indicating that data is ready, so that data can be read from registers 56. In the event the data ready signal is not used, control passes directly from box 112 to box 116. The routine ends at box 118.

In the distance mode of data capture operation, a software routine is provided which enables a machine operator to specify distance increment(s) for any or all of the X, Y, Z, A and C axis. The distance increment data entered by the machine operator is stored in appropriate memory, which may reside either in real time data collection computer 34, data analysis computer 24, or numerical controller 22. The travel of the measuring machine along its X, Y, Z, A and C axes is kept track of, and when the distance increment(s) stored in memory have been traversed, a data capture pulse is generated. Subsequent data capture pulses will be generated as the measuring machine continues to travel through incremental distances as specified by the stored distance increment data. In this manner, for example, a machine operator can set up the apparatus to automatically capture data every time a given distance is traversed in any one or more machine axis.

It should now be appreciated that the present invention provides a new and novel real-time data collection apparatus for use in collecting data from a multi-axis measuring machine. Automatic, continuous measurements can be taken with accuracies heretofore unobtainable in an automated CMM. The measuring machine includes sensor means for outputting position measurement data from at least one axis thereof, and a measuring probe having means for producing an output signal as a function of probe deflection. Data from the sensor means and probe are captured simultaneously, thereby ensuring an extremely high degree of accuracy. Such data can be subsequently analyzed on a data analysis computer and/or displayed on a display associated with the measuring machine.

What is claimed is:

1. A multi-axis measuring machine comprising:
   X, Y and Z axes;
   sensor means for measuring dimensions along each of said axes;
   a measuring probe having means for producing an output signal as a function of probe deflection; and
   a microcomputer for real time collection and processing of data from said sensor means and measuring probe, said microcomputer comprising:
   clock means for producing periodic data capture signals to effect periodic data capturing operations;
   means for disabling said clock means from effecting data capturing operations;
   manually actuable switch means for producing a data capture signal, thereby enabling a data capturing operation to be effected externally when said clock means are disabled from effecting data capture operations;
   means for simultaneously capturing dimension data from said sensor means and deflection data from said probe in response to a data capture signal; and
   means for forwarding the simultaneously captured data from the sensor and probe means to a data analysis computer.

2. The apparatus of claim 1 further comprising:
   means for inputting distance increment data; and
   means for producing a data capture signal when said sensor means detects a change in position measurement data along one or more of said axes which meets a condition established by said distance increment data.

3. The apparatus of claim 1 wherein said measuring probe produces an analog output signal, said apparatus further comprising:
   an analog to digital converter; and
   means responsive to a data capture signal for triggering said converter to convert an analog signal from said probe to a digital signal.

4. The apparatus of claim 3 further comprising:
   means for generating a data ready signal after completion of an analog to digital conversion.

5. The apparatus of claim 4 further comprising:
   register means for storing data;
   means for transferring data captured from said sensor means to said register means;
   means for transferring data captured from said probe to said register means after conversion by said analog to digital converter; and
   means for transferring data from said register means to said data analysis computer in response to a data ready signal.

6. The apparatus of claim 5 further comprising:
   means for processing data from said register means in accordance with a predetermined algorithm as said data are transferred to said data analysis computer.

7. The apparatus of claim 6 further comprising:
   means for displaying processed data from said register means, in intelligible form, on a display associated with a multi-axis measuring machine from which said data are taken.

8. The apparatus of claim 5 wherein said probe produces output signals indicative of the magnitude of probe deflection in a plurality of different dimensions.

9. A real time data collection apparatus for use in collecting data from a multi-axis measuring machine comprising:
   sensor means for outputting digital position measurement data signals from at least one axis of a measuring machine;
   a measuring probe having means for producing analog output signals as a function of probe deflection;
   clock means for producing periodic data capture signals to effect periodic data capturing operations;
   means responsive to said data capture signals for simultaneously capturing signals from said sensor means and said probe;
   signal converter means for converting said analog probe signals to digital data signal equivalents and for producing a data ready signal upon completion of said signal conversion;
   register means, coupled to receive said sensor data and said converted probe data, for subsequently transferring said data to a data anaylsis computer in response to said data ready signal;
   means for disabling said clock means from effecting data capturing operations; and
   manually actuable switch means for producing a data capture signal, thereby enabling a measuring machine operator to externally effect data capturing operations when said clock means are disabled from effecting data capture operations.

10. The apparatus of claim 9 further comprising:

means for processing data from said register means in accordance with a predetermined algorithm as said data are transferred to said data analysis computer.

11. The apparatus of claim 10 further comprising:
means for displaying processed data from said register means, in intelligible form, on a display associated with a multi-axis measuring machine from which said data are taken.

12. The apparatus of claim 9 further comprising:
means responsive to a data capture signal for triggering said signal converter means to convert an analog signal from said probe to a digitial signal.

13. The appartus of claim 12 wherein said sensor means outputs position measurement data from a plurality of different axes and said probe produces output signals indicative of the magnitude of probe deflection in a plurality of different dimensions.

14. The apparatus of claim 13 wherein said sensor means comprises laser interferometers.

15. The apparatus of claim 13 wherein said data capturing means comprises:
means for inputting distance increment data; and
means for producing a data capture signal when said sensor means detects a change in position measurement data along one or more of said axes which meets a condition established by said distance increment data.

16. The apparatus of claim 9 further comprising:
means for inputting distance increment data; and
means for producing a data capture signal when said sensor means detects a change in position measurement data along an axis which meets a condition established by said distance increment data.

* * * * *